(12) United States Patent
Lauper et al.

(10) Patent No.: US 7,630,524 B2
(45) Date of Patent: Dec. 8, 2009

(54) BIOMETRIC IDENTIFICATION AND AUTHENTICATION METHOD

(75) Inventors: Eric Lauper, Bern (CH); Adriano Huber, Locarno (CH)

(73) Assignee: Swisscom Mobile AG, Bern (CH)

(*) Notice: Subject to any disclaimer, the term of this patent is extended or adjusted under 35 U.S.C. 154(b) by 0 days.

(21) Appl. No.: 12/020,962

(22) Filed: Jan. 28, 2008

(65) Prior Publication Data

US 2008/0137916 A1 Jun. 12, 2008

Related U.S. Application Data

(63) Continuation of application No. 10/290,663, filed on Nov. 8, 2002, now Pat. No. 7,346,195.

(30) Foreign Application Priority Data

May 16, 2000 (WO) .................... PCT/CH00/00270

(51) Int. Cl.
*G06K 9/00* (2006.01)
(52) U.S. Cl. .................................... 382/117
(58) Field of Classification Search .............. None
See application file for complete search history.

(56) References Cited

U.S. PATENT DOCUMENTS

| 4,641,349 A | 2/1987 | Flom |
|---|---|---|
| 5,937,383 A | 8/1999 | Ittycheriah et al. |
| 6,104,922 A | 8/2000 | Baumann |
| 6,193,153 B1 | 2/2001 | Lambert |
| 6,542,624 B1 | 4/2003 | Oda |
| 6,592,223 B1 | 7/2003 | Stern et al. |
| 6,657,538 B1 | 12/2003 | Ritter |
| 6,699,212 B1 | 3/2004 | Kadziauskas et al. |
| 6,717,518 B1 | 4/2004 | Pirim et al. |
| 6,850,631 B1 * | 2/2005 | Oda et al. ............... 382/117 |
| 7,027,617 B1 * | 4/2006 | Frischholz ............. 382/107 |
| 2002/0122572 A1 | 9/2002 | Seal et al. |

FOREIGN PATENT DOCUMENTS

| DE | 19810792 A1 | 9/1999 |
|---|---|---|
| GB | 2281838 | 3/1995 |
| WO | 94/09472 | 4/1994 |
| WO | 97/37339 | 10/1997 |
| WO | 97/46978 | 12/1997 |
| WO | 98/08439 | 3/1998 |
| WO | 98/13720 | 4/1998 |
| WO | 99/18842 | 4/1999 |
| WO | 99/24938 | 5/1999 |

OTHER PUBLICATIONS

Kasprowski, Eye Movements in Biometrics, 2004, Springer-Verlag Berlin Heidelberg.*
Westeyn, Biometric Identification using Song-Based Blink Patterns, 2004.*

* cited by examiner

*Primary Examiner*—Bhavesh M Mehta
*Assistant Examiner*—Alex Liew
(74) *Attorney, Agent, or Firm*—Pearne & Gordon LLP

(57) ABSTRACT

Biometric identification and/or authentication method for identifying and/or authenticating the user (1) of a terminal (2), wherein said user is identified and/or authenticated by means of personal involuntary eye movement patters being determined with an eye-movement detection module (20).

The user is identified and/or authenticated for example by means of characteristics of the personal trajectory (51) of the eyes on an image being determined.

30 Claims, 3 Drawing Sheets

BIOMETRIC IDENTIFICATION AND AUTHENTICATION METHOD

This application is a continuation of application Ser. No. 10/290,663, filed on Nov. 8, 2002, which is a continuation of PCT application No. PCT/CH00/00270 filed May 16, 2000, the contents of which is hereby incorporated by reference.

FIELD OF THE INVENTION

The present invention concerns a biometric identification and authentication method. The present invention concerns in particular a method making it possible to identify and/or authenticate users with eye-based characteristics.

RELATED ART

Different methods are already known for determining the identity of a user in a communication network. Often, the user is required to enter his identity himself; a password is usually required so that only the authorized user can use this identity in the network. It is however difficult to remember the many different passwords for different applications. The entering of passwords with terminals having only a small keyboard (for example with mobile radio telephones or with palmtops) is furthermore burdensome and error-sensitive.

It is also known to use an identification module (for example in the form of a chip-card) in which the user's identity, for example his IMSI (International Mobile Subscriber Identity) in the case of a mobile radio network, is stored in a secured area. This identity however enables only the chip-card to be identified. If the same module is used by several users (for example when several users use the same mobile radio telephone), this method does not allow the identity of the terminal's actual user to be determined.

So-called biometric identification methods have also been proposed that enable the identity of a user to be determined on the basis of personal body characteristics (for example finger prints, language features, iris or retina patterns etc.). An example of such a method is described in patent application WO99/24938.

Finger prints, iris and retina patterns can be determined with a biometric sensor (for example with a camera). The sensor supplies an image data that is compared with reference images stored in a reference database. Different methods are known for comparing the determined image data with the stored references in a database and for finding the best matching sample data.

Such image data are however relatively large and must be compressed before being sent to the reference database, in order for the transmission time not to be too long. This compression is however time-consuming and requires processing power that is not always available; the compressed data is often still too large for a quick and cheap transmission. Furthermore, the process of comparing images in the reference database is very time-consuming.

Similar solutions having similar problems are also used for authenticating users in a communication network, i.e. for checking the identity of an already identified user.

DE19810792 describes a method for verifying the authenticity of an image. A sequence of chronologically consecutive single images of the user's face is recorded and only then judged authentic if at least in two consecutive images of the sequence intrinsic movements are determined. A single image is then compared with a reference image for verifying the user's authenticity. This method as well requires relatively large image data to be used.

U.S. Pat. No. 4,641,349 describes a similar method wherein only the iris is recorded rather than the whole face. The image data of the iris is compared with reference images. Relatively large image data are also required here.

WO9746978 describes a device for recording an image of the user's iris and to encode so-called iris codes that are forwarded to a remote server. The encoding is however time-consuming and uses considerable processing power in the terminal.

It is an aim of this invention to propose a new and improved method for identifying the user of a terminal and/or for checking the identity of a user (authentication).

It is another aim to propose a new biometric method for identifying a user in a communication network independently of the used terminal.

It is another aim to propose a new biometric identification and authentication method that generates comparison data of relatively small size.

BRIEF SUMMARY OF THE INVENTION

According to the present invention, these aims are achieved in particular through the characteristics of the independent claims. Further advantageous embodiments are moreover described in the dependent claims and in the description.

In particular, these aims are achieved in that the user is identified and/or authenticated by personal involuntary eye movement patterns being determined with an eye-movement detection module, for example an eye-tracking module.

Involuntary eye movements (for example the trajectory of the eye when scanning an image) are dependent on personal neurological synapses between different representation functions in the neurological system and between different neural structures. Every person scans an image with the eyes in a very personal manner, some faster, others with more saccades, etc. Some viewers blink more often than others, or as a reaction to other occurrences (for example to changes in light conditions or to emotional states). Variations in the diameter of the pupil also result in personal patterns.

By determining these involuntary eye movement patterns (for example with an eye-movement detection module), it is thus also possible to determine comparison data that unequivocally identify the viewer and/or with which the user identity can be checked.

This has the advantage that the determined comparison data are relatively small and can thus be transmitted very fast and cost-effectively. Furthermore, it is very difficult to deceive the inventive method.

If this method is used with terminals that already have an eye-tracking, it can be performed with relatively little effort. In comparison with systems that record an image of the iris or of the retina, the inventive method is only moderately intrusive. The eye-tracking module can for example be a camera that does not necessarily have to be in immediately proximity to the user's eye.

DESCRIPTION OF THE DRAWINGS

Hereafter, an embodiment of the present invention will be described on the basis of an example. The example of the embodiment will be illustrated through the following attached figures, in which.

DETAILED DESCRIPTION OF THE INVENTION

Figure 1:
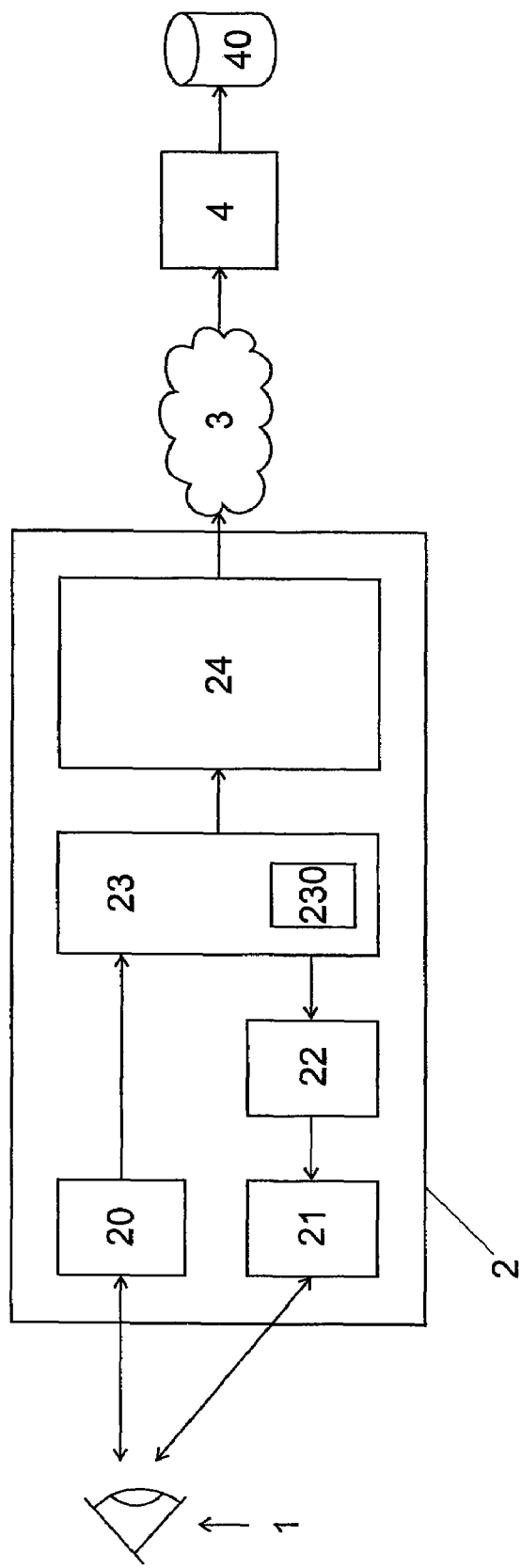
FIG. 1 shows a block diagram illustrating diagrammatically, on the one side, a terminal according to the invention and, on the other hand, a server according to the invention that is connected with this terminal over a communication network.

In FIG. 1, the number 1 refers to the user of a terminal 2 with which transactions can be conducted over a telecommunication network 2 with a remote server 4. The terminal 2 is preferably portable and can in a preferred embodiment be a mobile telephone, a palmtop, a laptop or a combination of different interconnected components, the connection preferably taking place over a PC card, IrDA or Bluetooth interface. In a preferred embodiment, the terminal contains a chip-card (not represented), for example a SIM (Subscriber Identification Module) card, in which user-specific data are stored.

The terminal contains a module 20 for determining eye movements. The module 20 consists for example of an eye-movement detection module (Eye Tracker) that can determine the current viewing direction on the basis of the position of the pupil and/or of the head of the user 1. Such eye-movement detection modules have been described among others in patent application WO94/09472. Preferably, the module 20 can determine different types of involuntary eye movements, for example blinking, as described in patent application GB2281838, variations in the pupil's diameter, etc. According to the embodiment, either movements of only one eye or of both eyes can be determined; in this latter case, squinting eye movements can also be determined.

Other systems for determining eye movements are also known that are also mounted in special contact lenses, or that record a video image of the eye. A faster sampling rate has been achieved with laser scanners that scan the iris up to 200 times per second.

In order for the terminal to react only to the movements of live creatures and not for example to be deceived by the presentation of animated images, body reactions are preferably determined by the module 20. In a preferred embodiment, a parameter dependent on the body temperature is measured, for example the reaction of the retina to a warming caused through the terminal 2. In another variant embodiment, the reaction of the iris to light variations caused through the terminal 2 are determined. In this manner it is possible to check whether the determined image of the eye really belongs to a human.

The terminal 2 further comprises image reproduction means 21 that can reproduce visible images for the user 1. In a first variant embodiment, the image reproducing means 21 consist of a conventional display, for example of a CRT liquid crystal display or plasma display. In a preferred embodiment, they consist of a so-called micro-display with an appropriate lens system, preferably of a VRD (Virtual Retinal Display) that projects the represented image directly onto the retina of one or both eyes of the user 1.

Virtual retinal display devices have for example been described in the patent applications WO94/09472, WO97/37339 and WO98/13720 and therefore no longer need be described. The VRD device 21 is controlled by a video controller 22 in order to project image signals corresponding to a two-dimensional or three-dimensional image onto the fovea of the user's eye.

The terminal 2 is controlled by data processing means 23, for example in the form of a processor 23 with a memory area (not represented). The processor 23 controls in particular the video controller 22 and processes the data from the module 20 for determining the movements of eye parts. A software and/or hardware module 230 in the processor 23 or connected with this processor is responsible for securing the data transmission with external devices 4, as will be explained later.

The one skilled in the art will understand that the data processing means 23 and the security module 230 can be made from a single chip or from a plurality of logically interconnected components. In a preferred embodiment, in which the terminal 2 consists of a mobile telephone, the data processing means 23 preferably comprise components in the mobile telephone as well as components in the removable chip-card (SIM card) that is connected with this mobile telephone. In a preferred embodiment, in particular the security-critical components used by the security module 230 are located in the chip-card.

The terminal further comprises a communication part 24 with which it can connect with a communication network 3. The communication part 24 preferably consists of a GSM or UMTS communication part, of a modem or of a contactless interface at close range, for example according to IrDA, Bluetooth, HomeRF or DECT.

The communication network 3 is for example a mobile radio network, for example according to GSM or UMTS, but could also be the internet or consist of several networks. The terminal can connect with a remote server 4 over the communication network 3, for example with a http or WAP server, that is administered by the operator of the communication network 3 and/or by a service provider. The data transmission between the terminal 2 and the remote server 4 is preferably secured end-to-end, for example with the protocol SSL (Secure Sockets Layer), TLS (Transport Layer Security) and/or WTLS (Wireless Transport Layer Security). Data sent from the terminal 2 to the server 4 are preferably signed electronically by the security module 230, preferably with an electronic private key stored in an electronic certificate in the SIM card or in the security module 230.

The terminal 2 preferably comprises additional data input means (not represented), for example a keyboard, a mouse, a scroll element, a microphone etc., with which the applications in the processor 23 can be controlled.

The user 1 can establish a session with the server 4 by entering the corresponding URL address or telephone number in his terminal 2. A session can for example be established in order to perform a transaction between the user 1 and the service provider that administers the server, for example in order to order and/or pay for a product or a service of the service provider 4.

Figure 2:
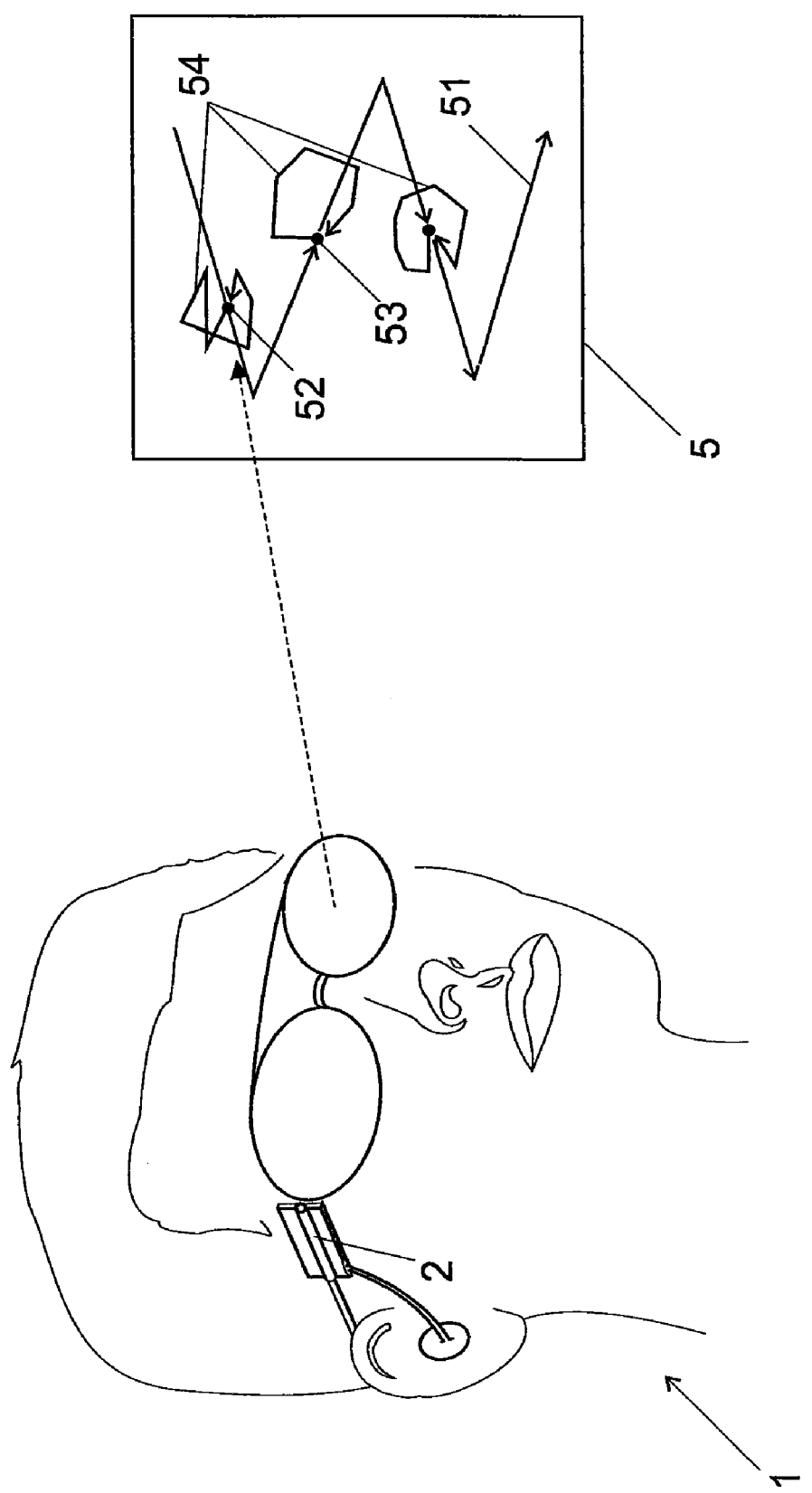
FIG. 2 shows an example of the eye trajectory of a user viewing an image with a virtual retinal device.

FIG. 2 shows diagrammatically a user 1 with a variant embodiment of the terminal according to the invention, here integrated in a pair of glasses. The glasses contain a mobile radio part 24, a VRD display device 21 that can project images onto the retina of the user 1, the processor 23 and an eye-tracking system 20. The reference sign 5 shows an example of the trajectory of an eye when scanning an image 5 presented to the user.

In order for a transaction to be conducted between the user 1 and the server 4, the user 1 must be identified. The used terminal 2 can be identified relatively easily on the basis of the transmitted call number (MSISDN) or of the number stored in the terminal's chip-card (IMSI, International Mobile Subscriber Identification); this identity can also be determined with an electronic signature of the transaction records.

If the terminal 2 is used by several people (for example by several family members), the stored identification is not sufficient for identifying the person who is indeed using the terminal 2; only the chip-card is identified, not the actual user of this card. If the terminal 2 is stolen or used by a nonauthorized person, the transmitted identity must be authenticated for security-critical transaction.

According to the invention, this identification and authentication process is performed with a biometric method in which personal involuntary eye movement patterns can be determined.

With the eye-movement detection module 20 different types of involuntary eye movements can be determined that can serve for identifying and/or authenticating the user; of these, only a few examples will be described.

When scanning an image, the eye moves along a trajectory 51, an example of which is represented in FIG. 2. Neurologists and physicians have already observed that this trajectory is not linear; the eye remains directed longer on certain points 52, 53, then moves fast until it finds another point of interest, etc. The eye furthermore makes rapid movements known as saccades 54, in order to perceive the marginal areas. In order to scan a new image, the eye makes large saccades, usually from one margin to another. Around a position, the eye also makes micro-saccades that are local. The shape, number and triggers of the saccades are personal and thus constitute an identification and/or authentication characteristic.

The trajectory of the eye of the user 1 on a certain image depends on the eye's physiology, among others on its muscles, but especially on the neurological structures of the user's brain. It is therefore absolutely personal and can be used to identify and/or authenticate the user.

According to the invention, certain characteristics of this trajectory (for example the preferred scanning direction, the average scanning speed and/or acceleration, the number of viewing points, the time at each point, the number and form of micro-saccades and of the larger saccades, the trajectory's entropy etc.) are determined by the eye-movement detection module and/or by the processor 23, in order thus to determine a user-specific eye movement pattern with which the user can be identified and/or authenticated.

The processor 23 can also determine other movement patterns, for example blinking movement patterns. Some users blink more often than others, or as a reaction to other events. If a three-dimensional image is presented to the user 1, it also possible to determine the accommodation of the eye to the distance (eye focalization pattern). As a variant embodiment or as an additional parameter, the variations in the pupil's diameter (for example the reaction time, the speed of adaptation, the absolute value etc.) can be used. It will be understood that the determined eye movement pattern can also take into account movements of both eyes. In a preferred embodiment, the determined eye movement takes into account different types of eye movements.

Preferably, a two-dimensional or three-dimensional image 5 is presented to the user with the image reproduction means 21. The module 20 determines said eye movement pattern during the viewing of this image. In this manner, the eye movement pattern is determined with a known reference image, so that no image-dependent pattern variations can occur.

Figure 3:
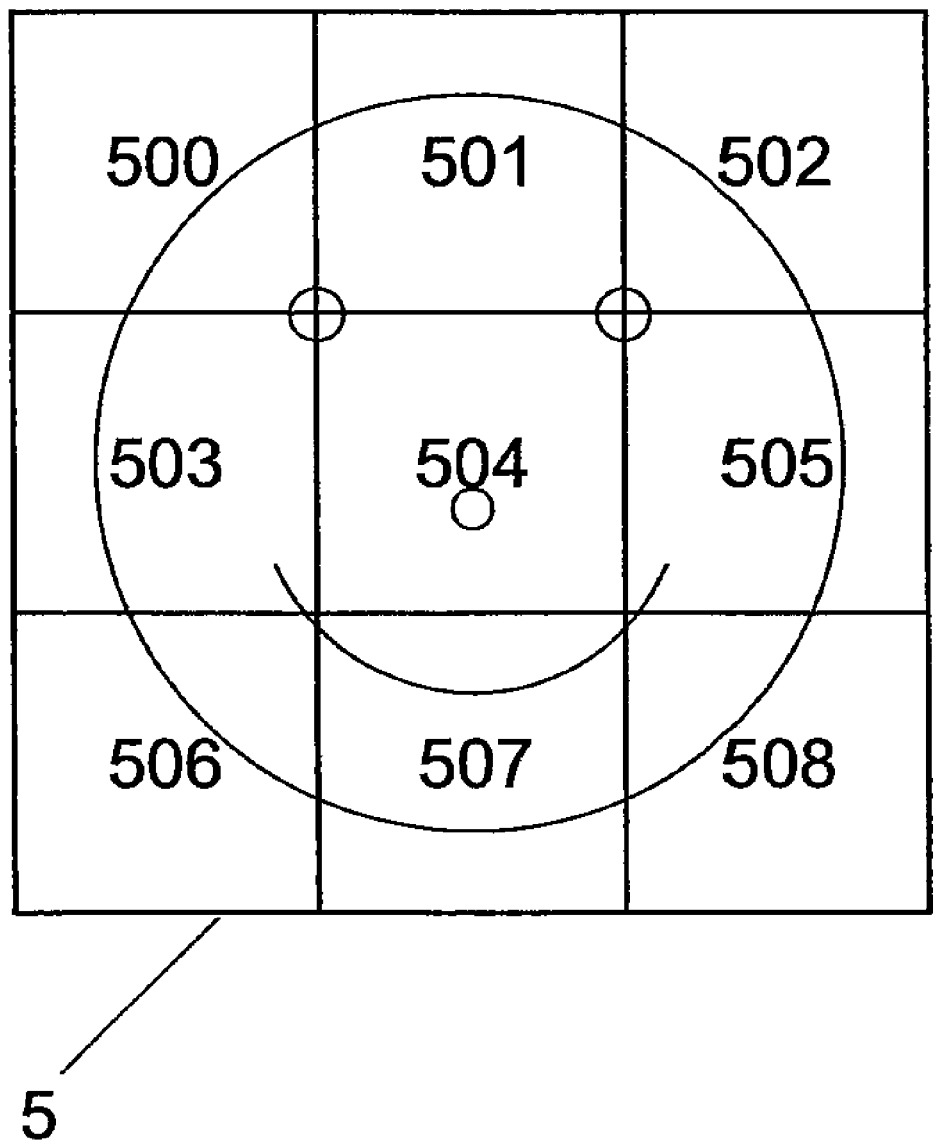
FIG. 3 shows an example of an image that can be presented to the user.

The image presented to the user can contain for example a logo or an introductory image of the service provider 4, that is presented to the user 1 at every access to this service provider's server. An example of such an image is represented in FIG. 3. In this example, the image is divided logically in several image areas 500 to 507; the personal eye movement pattern can then also contain indications about those areas onto which the eye is directed longest, about the sequence of the viewed image areas, etc.

As a variant embodiment, it is also possible to present to the user 1 a sequence of several images. The scanning trajectory over each image, the variations in the pupil's diameter when images change, the blinking as a reaction to changes in light conditions or to the image content, etc., can then be used for identifying and/or authenticating the user. Thus, it is possible to cause eye movements (for example by presenting special images or image sequences) and determine as a pattern the reaction to these images or image sequences (for example the variations in the pupil's diameter or the blinking).

The determined eye movement patterns is then encoded by the processor 23 in order to compute a digital or alpha-numerical code that identifies the user 1 as unequivocally as possible, and whose size is minimal so that it is transmitted fast. The resulting comparison data are then forwarded over a suitable transmission channel (for example with a known WAP bearer) by the communication part 24 to the server 4 of a service provider. The transmission is preferably secured end-to-end; preferably, a security module 230 in the processor 23 or in a chip-card in the terminal 2 further signs the comparison data electronically and encrypts it with the public key of the service provider 4, so that only the latter can decrypt the comparison data and can verify their origin.

The server 4 contains or accesses a reference database 40 in which eye movement data of all registered users are stored. These reference data are for example determined when the user registers with the service provider and stored in the database 40.

In order to identify the user 1, the server compares the received comparison data with all the reference data stored in the database 40. The server determines from the reference database 40 the identity of the user having the reference data that are the closest to the received comparison data. This identity can be used for further transactions.

The comparison between the received comparison data and the stored reference data can for example be performed with a Viterbi-grid that indicates the most likely user from among all the registered users.

It is often not necessary to compare the received comparison data with all the reference data in the reference database 40. If the identification of the used terminal 2 is already known, the server can search among only the usual users of this terminal (for example among the family members). The method according to the invention can thus be used for determining the actual current user of the terminal 2 from among all the authorized or usual users of the terminal.

This method can also be used to verify an already known identity (authentication). If the user identity has already been entered by the user himself, a comparison between the received comparison data and the reference data stored for this user in the database 40 can decide whether the entered identity is plausible.

The one skilled in the art will understand that the comparison between the determined data and the stored data can also be performed in the terminal 2. In this case, access to this terminal or to certain functions or programs in this terminal is only then allowed when the result of this comparison is positive, i.e. when the user identified and/or authenticated with his involuntary eye movements is authorized.

Similarly, it is also possible to store in the reference database 40 only a derived form of the eye movement pattern that is forwarded before every identification or authentication process to the terminal 2. The comparison between the determined comparison data and these reference data is then performed in the terminal. This embodiment has the advantage that personal reference data possibly subjected to data protection are not stored in the reference database 40.

Although this description refers in particular to the special case of the identification and authentication of a user of a mobile radio telephone, the one skilled in the art will understand that the method according to the invention can also be used for identifying and authenticating users of other devices. For example, this method can also be used with computers, for example for transactions over the internet or in order to make secure the access to company servers.

The invention claimed is:

1. A biometric identification and/or authentication method using a computer having a processor executing software for performing the method for identifying and/or authenticating the user of a terminal, said method comprising the steps of:
   automatically determining, using the computer, a user-specific eye movement pattern when the eye moves along a trajectory, said user specific pattern including involuntary eye movements of an eye of the user; and
   automatically identifying and/or authenticating the user using the computer by utilizing said determined user-specific eye movement pattern.

2. The biometric identification and/or authentication method of claim 1, further comprising the step of presenting a pre-defined image to the user, wherein the user is identified and/or authenticated by means of said personal eye movement trajectories being determined while the user is viewing said image 3. The biometric identification and/or authentication method of claim 2, wherein said image is reproduced with a virtual retinal display.

4. The biometric identification and/or authentication method of claim 1, further comprising the step of presenting an image sequence to the user, wherein said user is identified and/or authenticated by means of personal eye movement trajectories determined while the user is viewing said image sequence.

5. The biometric identification and/or authentication method of claim 4, wherein said image sequence is reproduced with a virtual retinal display.

6. The biometric identification and/or authentication method of claim 1, wherein said eye direction trajectories include saccades.

7. The biometric identification and/or authentication method of claim 1, wherein said eye direction trajectories include determined eye focalization trajectories.

8. The biometric identification and/or authentication method of claim 1, wherein the user is identified and/or authenticated by means of personal variations in the pupil's diameter being determined.

9. The biometric identification and/or authentication method of claim 8, wherein said variations are caused through changes in the light conditions.

10. The biometric identification and/or authentication method of claim 8, wherein at least one pre-defined image sequence is presented to the user and wherein said user is identified and/or authenticated by means of determining said variations when the image changes.

11. The biometric identification and/or authentication method of claim 1, wherein said eye movement trajectories take into account eye movement trajectories of both eyes of the user.

12. The biometric identification and/or authentication method of claim 1, wherein said eye movement trajectories are encoded in comparison data and compared with reference data stored in a reference database.

13. The biometric identification and/or authentication method of claim 12, wherein the comparison between said comparison data and said reference data is performed utilizing a Viterbi-grid.

14. The method of claim 1, wherein a parameter dependent on the body temperature is measured and used as an additional authentication parameter.

15. The method of claim 1, wherein a parameter dependent on the warming of the retina is measured and used as an additional authentication parameter.

16. The method of claim 1, wherein a reaction of the iris to light variations is measured and used as an additional authentication parameter.

17. The method of claim 1, wherein said eye movement trajectories are determined through a portable terminal and transmitted through a mobile radio part in said terminal over a mobile radio network to a remote server.

18. The method of claim 17, wherein said server is administered by a service provider and wherein the connection between said mobile radio part and said server is encrypted end-to-end.

19. The method of claim 18, wherein said eye movement trajectories are signed electronically.

20. The method of claim 17, wherein said eye movement trajectories are signed electronically.

21. The method of claim 20, wherein eye movement trajectories are signed electronically with a private key of said user.

22. The method of claim 1, wherein said determining utilizes an eye-movement detection module.

23. A method for identifying and/or authenticating the user of a terminal for a transaction with a server using the terminal, said terminal comprising a communication part, an eye-movement detection module, and a mobile radio part including a chip-card with a chip-card identification, said method comprising the steps of:
   said terminal using said communication part for sending instructions for said transaction over a communication network to said server;
   said eye-movement detection module detecting a user-specific eye movement pattern when the eye moves along a trajectory, said user specific eye movement pattern including involuntary eye movements of the user; and
   said server identifying and/or authenticating the user by utlilizing said chip-card identification and said determined user-specific eye movement pattern utilizing eye movement data of registered users previously stored in said server.

24. The method of claim 23, wherein said terminal further comprises a virtual retinal display device for displaying an image to the user in support of said detecting step.

25. A biometric identification and/or authentication method using a device including an eye movement detection module for performing the method for identifying and/or authenticating the user of a terminal, said method comprising the step of:
   automatically presenting, using the device, at least one pre-defined image for viewing by the user;
   using the eye-movement detection module for detecting a user-specific eye movement pattern when the eye moves along a trajectory, said user-specific eye movement pattern including involuntary eye movements of the user;
   automatically identifying and/or authenticating the user, using the device, by means of said determined user-specific eye movement pattern.

26. The biometric identification and/or authentication method of claim 25, wherein said image is reproduced with a virtual retinal display.

27. The method of claim 25, wherein a sequence of images is presented for viewing by the user.

28. A biometric identification and/or authentication method using a device having a processor executing software for performing the method for identifying and/or authenticating the user of a terminal, said method comprising the steps of:

automatically presenting, using the device, an image to the user;

automatically detecting, using the device, a user-specific eye movement pattern when the eye moves along a trajectory, said user-specific eye movement pattern including larges saccades to scan the images and micro-saccades that are local; and automatically identifying and/or authenticating, using the device the user using said detected involuntary movements, wherein the shape, number, and triggers of said saccades of said involuntary movements are personal and thus constitute an identification and authentication characteristic.

29. The method of claim 25, wherein a sequence of several images is presented to a user during said detecting step.

30. The method of claim 29, wherein an eye-movement detection module is used for said detecting.

\* \* \* \* \*